United States Patent Office 3,450,395
Patented June 17, 1969

3,450,395
ROCKING FURNACE FOR SINTER-MOLDING PLASTIC OBJECTS
Lars Ringdal, Oslo, Norway, assignor to A/S Ringdal Patenter, Baerum, near Oslo, Norway
Filed Aug. 3, 1966, Ser. No. 569,953
Int. Cl. F27b 7/00
U.S. Cl. 263—33     1 Claim

ABSTRACT OF THE DISCLOSURE

An apparatus for molding plastic objects from plastic material including a rocking furnace having a chamber into which a rotatable mold containing plastic material is received so that the plastic material being fused in the mold is subjected to the rotary motion of the mold and the rocking motion of the rocking furnace.

---

The present invention concerns means for sinter-molding plastic objects where a mold filled with plastic mass is introduced into a furnace and heated on the exterior, to fuse a layer of plastic mass on the inside of the mold, said mold, subsequent to the desired wall thickness being achieved, being cooled and the object being removed.

In one known process, the so-called Engel process, as e.g. described in Norwegian Patent No. 101.002, a furnace is used wherein the mold is deposited from above and is heated by an encircling air stream. Since in this process, the mold is stationary, said mold must be filled to the rim with plastic powder, and, when the desired thickness of the objects is achieved, the non-fused powder is emptied from the mold and said mold is replaced in the furnace in order to fuse the powder remaining on the inside of the object.

This process is impractical and requires much labor, working space and heat energy. It is impossible to produce closed containers with this method moreover.

In another method, driving means are used to provide a "two-way" motion of the molds in a furnace. In accordance with this method the mold is filled with the exact amount of the plastic mass to be used, and this method is fairly satisfactory in the production of small objects. When larger objects are to be produced the driving means is necessarily large and complicated, and furnaces of great volume must be used, so that the utilization of heat energy and furnace volume is poor.

In the production of larger objects, it is frequently necessary to dispose the mold on a means where it is rotated and, at the same time, is capable of being tipped. In this cas gas jets or burners are used, which are disposed as far as possible in equal spacing from the walls of the mold.

This means is utilizable in the production of round objects, but is extremely uneconomical, as great loss of heat energy occurs. It is, moreover, impractical so far as the operation is concerned since the mold must be lifted to and from the means, for cooling and removal of the object. This method and means is not practical in the sinterging of square objects. Further, control of the heat and heat distribution is poor, and the products are also of a poorer quality.

In order to overcome these disadvantages and difficulties, it has been proposed, as described in Norwegian Patent No. 95,220, to construct carriages having the mold rotatably and pivotably mounted thereon for transporting to and from the furnace, so that the mold effects a pivoting and rotating motion during the sintering process in the furnace and during cooling. Good heat control and distribution is achieved by this method, and the products are of good quality. The method entails the disadvantage of necessitating furnaces of great volume however, and, consequently, poor utilization of the heat energy. The furnace and means are large, heavy and space consuming.

The invention proposes to abolish the disadvantages of the known methods and means for sinter-molding plastic objects, and aims particularly at providing a furnace which is practical in use for both large and small plastic objects.

To this purpose the invention consists primarily in the use, for sinter-molding of plastic objects as mentioned in the introduction, of a furnace to which a reciprocal rocking or pivoting motion is imparted during sintering, preferably about the centre axis of said furnace, the mold or molds being simultaneously maintained in a rotating motion within the furnace in a manner known per se. The furnace is then suitably used in connection with a means, as shown and described in Norwegian Patent No. 95,220, where the molding apparatus (the mold or molds) with axle, driving means and motor is arranged on a frame or rack supported on a carriage which is movable forwards and backwards, to place the mold or molds within, or remove them from the furnace.

By using a furnace which effects a rocking motion during sintering, as above described, a greatly improved utilization of both space and heat energy is achieved to that in the known methods and arrangements. The carriages may be lightweight and simple since there is no necessity of a "two-way" motion of the molds.

A further important feature of the invention is that the position of the furnace may be adjusted and fixed so that a mold may be disposed and rotate within the furnace at whatever angled esired. It is thereby possible to build up greater wall thicknesses in the desired location. It is thus possible to produce objects of any shape whatsoever.

In consequence of the rocking motion of the furnace, the vertical centre axis of the furnace may be located so as to form an angle, suitably of 45° to the horizontal, alternately to one side or the other. An extremely good heat distribution is achieved thereby, since the rising hot air stream can strike the furnace diagonally, alternately from either side.

An electrical motor is suitably used for the motion of the furnace, a time controlled relay known per se, being arranged in connection with the furnace, said time relay being actuated by lugs arranged in a circular arc on the furnace, in such a way that the motor may be redirected in turning points and the furnace may be stopped at the desired angle and for the desired period of time.

Two examples of the embodiment of the invention are more closely described in the following with reference to the drawings where:

Figure 1:
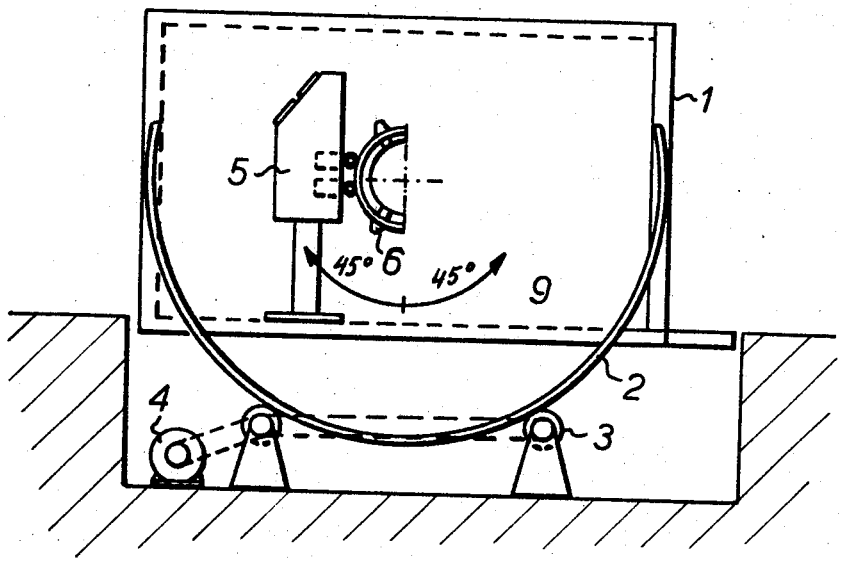
FIGS. 1 and 2 show two projections respectively, in diagram a first embodiment of the furnace with driving means and time relay.

In FIG. 1 the furnace is signified by 1 and is supported on rollers 3 by means of circular rails 2 attached to said furnace. When the rollers 3 rotate in one or the other direction, they impart by friction a rocking or pivoting motion to the furnace, suitably at an angle of 45° to either side.

The rollers are driven by chain operation from an electric motor 4 which is controlled by means of a time controlled relay 5 in ocnnection with the carriage, said time controlled relay being actuated by rigid lugs 6 arranged on the furnace in a circular arc. By means of said time relay (which is a standard equipment), the motor may be redirected in the turning points and also regulated for fixing the furnace in position at the desired angle and time periods.

Figure 2:
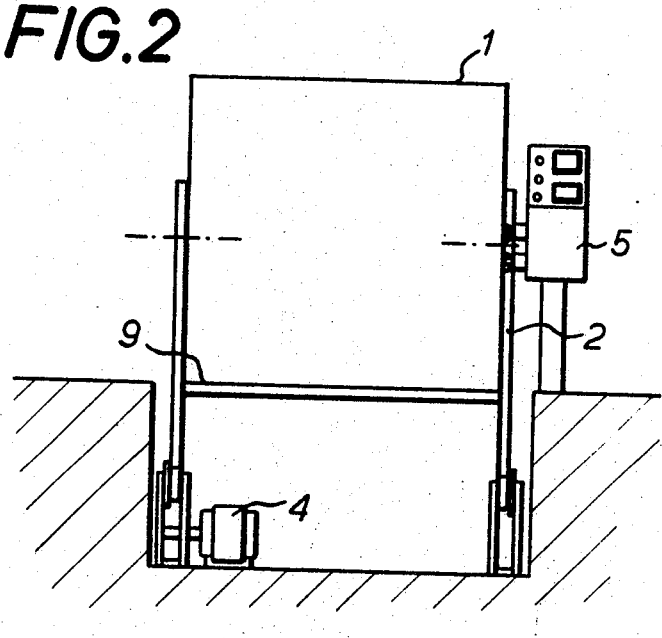
Figure 3:
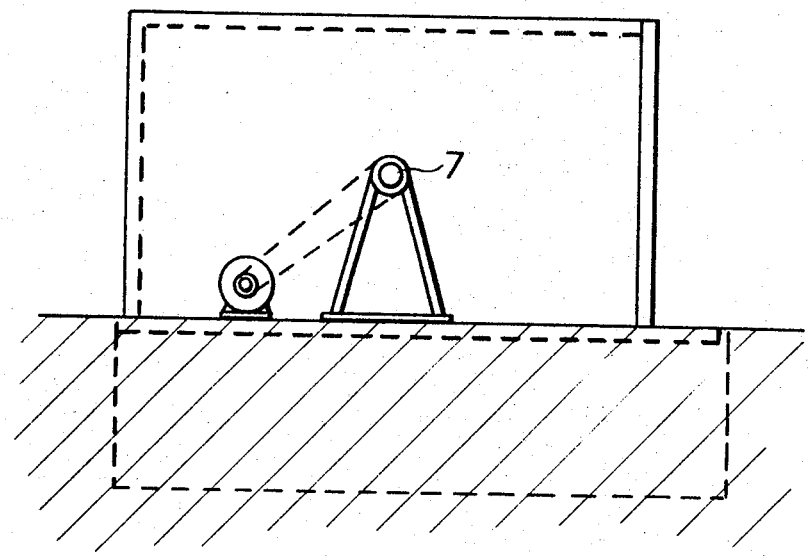
FIGS. 3 and 4 show, also in diagram, a second embodiment in two projections.
Figure 4:
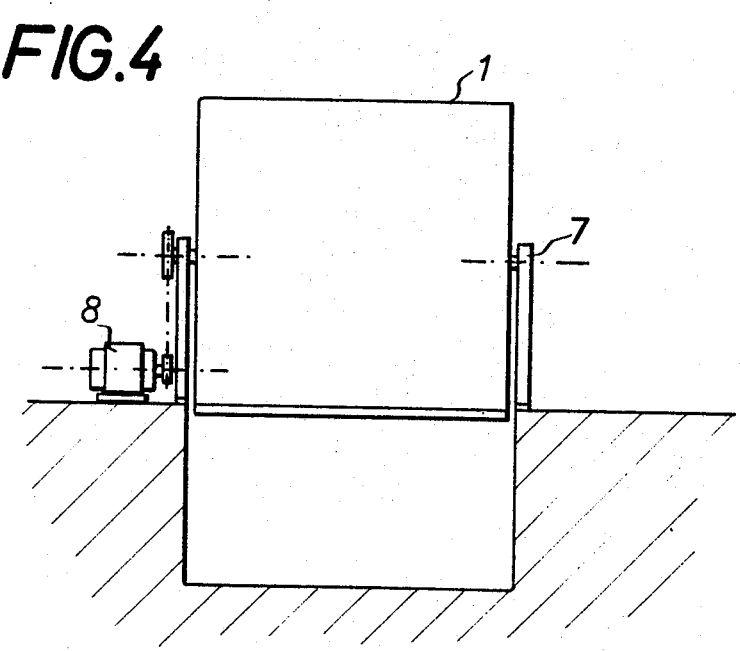

The embodiment example shown in FIGS. 3 and 4 is distinguished from that shown in FIGS. 1 and 2 only in that the driving means for imparting the rocking reciprocal motion to the furnace is different. The furnace in this case being supported by means of rotatably mounted axle taps 7, the furnace being rotated, i.e. having imparted to it a rocking motion, from the motor 8 by chain or belt operation. For the sake of simplicity the time relay is not shown in this embodiment example.

The mold or molds may be deposited in the furnace on the flat bottom 9 thereof in any suitable manner. They are preferably driven into the furnace on a carriage provided with driving means for rotation of the mold, e.g. as shown and described in Norwegian Patent No. 95,220. The furnace is closed and locked, the doors maintaining the mold in position.

The furnace may be constructed having a heating source of any system for electric, gas or oil heating. The volume of the furnace is adapted to the size of the carriages with the driving means.

By using the furnace according to the invention, the sintering can take place in a very short period of time, and energy saving, and advantageous distribution of the plastic powder, is achieved.

Plastic objects of substantially any shape may be produced in accordance with the described regulating possibilities, viz. the furnace may be stopped for shorter or longer periods either in horizontal position or in a position in which it forms any desired angle to the horizontal.

I claim:
1. In an apparatus for sinter-molding plastic objects from plastic material, including a furnace having a chamber for heating the plastic material, means for mounting the furnace for movement in a rocking motion relative to a fixed axis, and means for effecting the rocking of the furnace, wherein the improvement comprises an apparatus combination including said rocking furnace and a rotatable mold for plastic material introduced into and mounted in the furnace chamber, whereby the plastic material contained in the rotatable mold, during operation of the appaartus, not only receives the motion of the rotating mold but also simultaneously receives the rocking motion provided by the rocking of the furnace while the plastic material is being fused.

References Cited
UNITED STATES PATENTS

| | | |
|---|---|---|
| 1,076,705 | 10/1913 | Ross _____ 263—33 X |
| 2,121,109 | 6/1938 | Weinheimer _____ 263—21 |
| 2,151,439 | 3/1939 | Pittman et al. _____ 263—33 |
| 2,442,550 | 6/1948 | Rubissow. |
| 3,372,820 | 3/1968 | Barnett. |

JOHN J. CAMBY, *Primary Examiner.*

U.S. Cl. X.R.

263—2